United States Patent
Kekre et al.

(10) Patent No.: US 7,664,793 B1
(45) Date of Patent: Feb. 16, 2010

(54) TRANSFORMING UNRELATED DATA VOLUMES INTO RELATED DATA VOLUMES

(75) Inventors: Anand A. Kekre, Pune (IN); John A. Colgrove, Los Altos, CA (US); Oleg Kiselev, Palo Alto, CA (US); Ronald S. Karr, Palo Alto, CA (US); Niranjan S. Pendharkar, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 412 days.

(21) Appl. No.: 10/610,961

(22) Filed: Jul. 1, 2003

(51) Int. Cl.
*G06F 12/16* (2006.01)
(52) U.S. Cl. .................. 707/204; 707/201; 711/162
(58) Field of Classification Search .............. 707/201, 707/204; 711/162
See application file for complete search history.

(56) References Cited

U.S. PATENT DOCUMENTS

| | | | |
|---|---|---|---|
| 4,096,567 A | 6/1978 | Millard et al. ................. 707/10 |
| 5,155,824 A | 10/1992 | Edenfield et al. ............. 395/425 |
| 5,210,866 A | 5/1993 | Milligan et al. ................. 714/6 |
| 5,497,483 A | 3/1996 | Beardsley et al. ............. 395/575 |
| 5,506,580 A | 4/1996 | Whiting et al. ................. 341/51 |
| 5,532,694 A | 7/1996 | Mayers et al. ................. 341/67 |
| 5,574,874 A | 11/1996 | Jones et al. ................. 395/376 |
| 5,610,893 A | 3/1997 | Soga et al. ............... 369/53.24 |
| 5,649,152 A | 7/1997 | Ohran et al. ................. 395/441 |
| 5,778,395 A | 7/1998 | Whiting et al. ............. 707/204 |
| 5,835,953 A | 11/1998 | Ohran ........................ 711/162 |
| 5,875,479 A * | 2/1999 | Blount et al. ............... 711/162 |
| 5,907,672 A | 5/1999 | Matze et al. ........... 395/182.06 |
| 6,061,770 A | 5/2000 | Franklin ....................... 711/162 |
| 6,073,222 A | 6/2000 | Ohran ........................ 711/162 |
| 6,085,298 A | 7/2000 | Ohran ........................ 711/162 |
| 6,141,734 A | 10/2000 | Razdan et al. ............... 711/144 |
| 6,189,079 B1 | 2/2001 | Micka et al. ................. 711/162 |
| 6,269,431 B1 | 7/2001 | Dunham ...................... 711/162 |
| 6,282,610 B1 | 8/2001 | Bergsten ...................... 711/114 |

(Continued)

FOREIGN PATENT DOCUMENTS

EP     0 332 210 A2    9/1989

(Continued)

OTHER PUBLICATIONS

Article entitled "Veritas Flashsnap Point-in-Time Copy Solutions", by: Veritas, dated Jun. 24, 2002.*

(Continued)

*Primary Examiner*—Tim T. Vo
*Assistant Examiner*—Mahesh H Dwivedi
(74) *Attorney, Agent, or Firm*—Campbell Stephenson LLP (57) ABSTRACT

Disclosed is an apparatus and method for transforming unrelated data volumes into related data volumes. The present invention is employed after creation of first and second unrelated data volumes. In one embodiment, the second data volume is refreshed to the data contents of the first data volume so that the second data becomes a PIT copy of the first data volume. Refreshing the second data volume includes overwriting all data of the second data volume with data copied from the first data volume. However, before all data of the second data volume is overwritten with data copied from the first data volume, data of the first data volume can be modified.

17 Claims, 9 Drawing Sheets

U.S. PATENT DOCUMENTS

| | | | | |
|---|---|---|---|---|
| 6,338,114 | B1 * | 1/2002 | Paulsen et al. | 711/112 |
| 6,341,341 | B1 | 1/2002 | Grummon et al. | 711/162 |
| 6,353,878 | B1 | 3/2002 | Dunham | 711/162 |
| 6,434,681 | B1 * | 8/2002 | Armangau | 711/162 |
| 6,460,054 | B1 | 10/2002 | Grummon | 707/204 |
| 6,564,301 | B1 | 5/2003 | Middleton | 711/144 |
| 6,591,351 | B1 | 7/2003 | Urabe et al. | 711/162 |
| 6,611,901 | B1 * | 8/2003 | Micka et al. | 711/162 |
| 6,643,667 | B1 | 11/2003 | Arai et al. | 707/200 |
| 6,643,671 | B2 * | 11/2003 | Milillo et al. | 707/204 |
| 6,665,815 | B1 * | 12/2003 | Goldstein et al. | 714/20 |
| 6,691,245 | B1 * | 2/2004 | DeKoning | 714/6 |
| 6,771,843 | B1 | 8/2004 | Huber et al. | 382/305 |
| 6,785,789 | B1 | 8/2004 | Kekre et al. | 711/162 |
| 6,792,518 | B2 | 9/2004 | Armangau et al. | 711/162 |
| 6,799,258 | B1 * | 9/2004 | Linde | 711/162 |
| 7,085,901 | B2 * | 8/2006 | Homma et al. | 711/162 |
| 2003/0041220 | A1 | 2/2003 | Peleska | 711/162 |
| 2003/0158834 | A1 | 8/2003 | Sawdon et al. | 707/1 |
| 2003/0158862 | A1 * | 8/2003 | Eshel et al. | 707/200 |
| 2005/0108302 | A1 * | 5/2005 | Rand et al. | 707/204 |

FOREIGN PATENT DOCUMENTS

| | | |
|---|---|---|
| EP | 0 566 966 A2 | 10/1993 |
| EP | 1 091 283 A2 | 4/2001 |

OTHER PUBLICATIONS

Article entitled Veritas FlashSnap: Guidelines for Using Veritas FlashSnap, by: Veritas, dated May 1, 2002.*

Article entitled Veritas FlashSnap: Using Veritas FlashSnap to Protect Application Performance and Availability, by: Veritas, dated May 14, 2002.*

Article entitled "Shadow Copied of Shared Folders: Frequently Asked Questions", by: Microsoft, dated Mar. 3, 2003.*

* cited by examiner

| n | $V_n$ | $M_n$ |
|---|---|---|
| 1 | 1 | 0 |
| 2 | 1 | 0 |
| 3 | 1 | 0 |
| 4 | 1 | 0 |
| 5 | 1 | 0 |
| 6 | 1 | 0 |
| ⋮ | | |
| $n_{max}$ | 1 | 0 |

30

| n | $R_n$ |
|---|---|
| 1 | 1 |
| 2 | 1 |
| 3 | 1 |
| 4 | 1 |
| 5 | 1 |
| 6 | 1 |
| ⋮ | |
| $n_{max}$ | 1 |

70

| n | $V_n$ | $M_n$ |
|---|---|---|
| 1 | 0 | 0 |
| 2 | 0 | 0 |
| 3 | 0 | 0 |
| 4 | 0 | 1 |
| 5 | 0 | 1 |
| 6 | 0 | 1 |
| ⋮ | | |
| $n_{max}$ | 0 | 1 |

34

| n | $V_n$ | $M_n$ |
|---|---|---|
| 1 | 1 | 0 |
| 2 | 1 | 1 |
| 3 | 1 | 0 |
| 4 | 0 | 0 |
| 5 | 0 | 0 |
| 6 | 0 | 0 |
| ⋮ | | |
| $n_{max}$ | 0 | 0 |

| n | $V_n$ | $M_n$ |
|---|---|---|
| 1 | 1 | 0 |
| 2 | 1 | 0 |
| 3 | 1 | 0 |
| 4 | 1 | 0 |
| 5 | 1 | 0 |
| 6 | 1 | 0 |
| ⋮ | | |
| $n_{max}$ | 1 | 0 |

30

| n | $R_n$ |
|---|---|
| 1 | 0 |
| 2 | 1 |
| 3 | 1 |
| 4 | 1 |
| 5 | 1 |
| 6 | 1 |
| ⋮ | |
| $n_{max}$ | 1 |

70

| n | $V_n$ | $M_n$ |
|---|---|---|
| 1 | 1 | 0 |
| 2 | 0 | 0 |
| 3 | 0 | 0 |
| 4 | 0 | 1 |
| 5 | 0 | 1 |
| 6 | 0 | 1 |
| ⋮ | | |
| $n_{max}$ | 0 | 1 |

34

| n | $V_n$ | $M_n$ |
|---|---|---|
| 1 | 1 | 0 |
| 2 | 1 | 1 |
| 3 | 1 | 0 |
| 4 | 0 | 0 |
| 5 | 0 | 0 |
| 6 | 0 | 0 |
| ⋮ | | |
| $n_{max}$ | 0 | 0 |

| n | $V_n$ | $M_n$ |
|---|---|---|
| 1 | 1 | 0 |
| 2 | 1 | 1 |
| 3 | 1 | 0 |
| 4 | 1 | 1 |
| 5 | 1 | 0 |
| 6 | 1 | 0 |
| ⋮ | | |
| $n_{max}$ | 1 | 0 |

30

| n | $R_n$ |
|---|---|
| 1 | 0 |
| 2 | 0 |
| 3 | 1 |
| 4 | 0 |
| 5 | 0 |
| 6 | 1 |
| ⋮ | |
| $n_{max}$ | 1 |

70

| n | $V_n$ | $M_n$ |
|---|---|---|
| 1 | 1 | 0 |
| 2 | 1 | 0 |
| 3 | 0 | 0 |
| 4 | 1 | 0 |
| 5 | 1 | 1 |
| 6 | 0 | 0 |
| ⋮ | | |
| $n_{max}$ | 0 | 0 |

34

| n | $V_n$ | $M_n$ |
|---|---|---|
| 1 | 1 | 0 |
| 2 | 1 | 1 |
| 3 | 1 | 0 |
| 4 | 1 | 0 |
| 5 | 1 | 0 |
| 6 | 1 | 1 |
| ⋮ | | |
| $n_{max}$ | 0 | 0 |

TRANSFORMING UNRELATED DATA VOLUMES INTO RELATED DATA VOLUMES

BACKGROUND OF THE INVENTION

Many businesses rely on large scale data processing systems for storing and processing data. The data in these systems is often stored as unrelated data volumes. These data volumes are often the working volumes of the data processing systems. Large scale data processing systems may receive requests from computer systems that require access to one of the data volumes. When the data processing system receives a request, one of the unrelated data volumes is accessed in a read or write operation.

At some point, it may be desirable to transform one of the unrelated data volumes into a point-in-time (PIT) copy of another data volume. In transforming one data volume, data is copied from memory that stores the one data volume to memory that stores the other data volume until the entire content of the other data volume is overwritten with new data. While data is being overwritten, write and/or read access is denied to both volumes involved in the transformation.

SUMMARY OF THE INVENTION

Disclosed is an apparatus and method for transforming unrelated data volumes into related data volumes. The present invention is employed after creation of first and second unrelated data volumes. In one embodiment, the second data volume is refreshed to the data contents of the first data volume so that the second data becomes a PIT copy of the first data volume. Refreshing the second data volume includes overwriting all data of the second data volume with data copied from the first data volume. However, before all data of the second data volume is overwritten with data copied from the first data volume, data of the first data volume can be modified.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
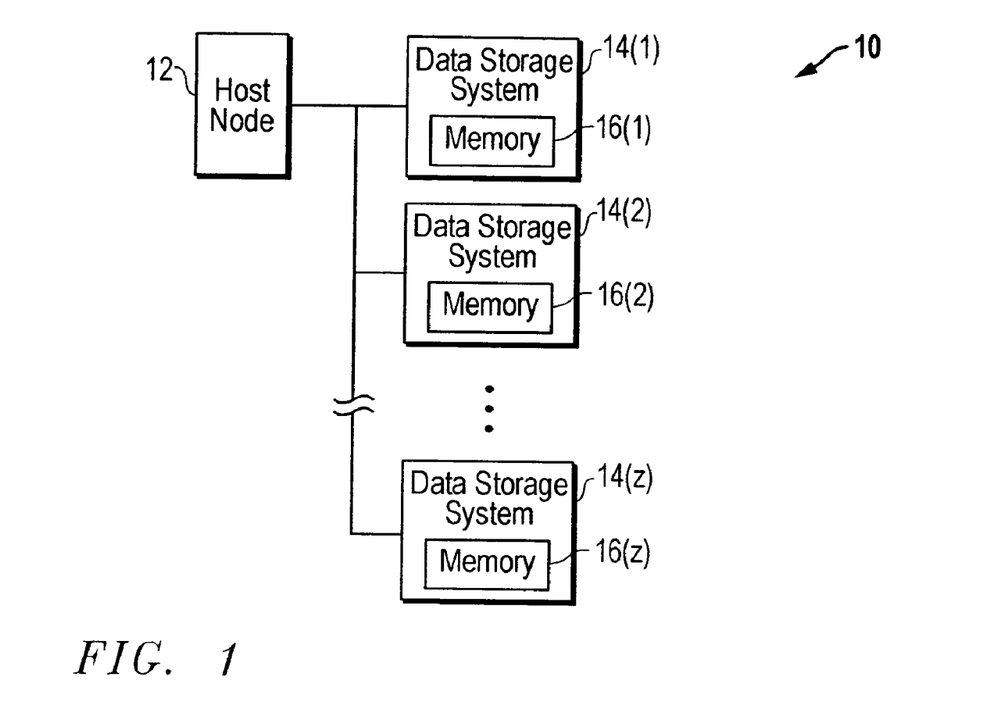
FIG. 1 is a block diagram of a data processing system.

FIG. 1 illustrates (in block diagram form) relevant components of a data processing system 10 employing one embodiment of the present invention. Data processing system 10 includes a host node 12 coupled to data storage systems 14(1)-14(z). Although host node 12 is shown coupled directly to data storage systems 14(1)-14(z), host node 12 in an alternative embodiment may be indirectly coupled to one or more of the data storage systems via an intervening third device. For purposes of explanation, host node 12 will be described as having direct access to data stored in storage systems 14(1)-14(z).

Each of the data storage systems 14(1)-14(z) includes memories 16(1)-16(z), respectively, for storing data. Each of these data memories may take form in one or more dynamic or static random access memories, one or more arrays of magnetic or optical data storage disks, or combinations thereof. The data memories 16(1)-16(z) should not be limited to the foregoing hardware components; rather, these data memories may take form in any hardware, software, or combination of hardware and software in which data may be persistently stored and accessed. The data memories may take form in a complex construction of several hardware components operating under the direction of software. The data memories may take form in mirrored hardware. It is further noted that the present invention may find use with many types of redundancy/reliability data storage systems. For example, the present invention may be used with a redundant array of independent disks (RAID) that store data. Moreover, the present invention should not be limited to use in connection with the host node of a data processing system. The present invention may find use in connection with a storage switch of a storage area network or in any of many distinctive appliances that can be used with a data storage system.

Data memories 16(1)-16(z) may store unrelated primary data volumes. For purposes of explanation, one or more of data memories 16(1)-16(z) will be described as storing only two unrelated primary data volumes V1 and V2, it being understood that the present invention should not be limited thereto. Initially, the primary data volumes V1 and V2 are unrelated to each other. Host node 12 may take form in a computer system (e.g., server computer system) that processes requests received from client computer systems (not shown) to perform a data transaction on one of the primary data volumes V1 or V2. Host node 12 generates read or write-data transactions that access one of the primary data volumes V1 or V2 in response to receiving A request from a client computer system. Write-data transactions write new data or modify (i.e., overwrite) existing data stored in memory.

Host node 12 can create and store in data memories 16(1)-16(z) two or more hierarchies of data volumes. For purposes of explanation, data memories 16(1)-16(z) will be described as storing only first and second hierarchies of data volumes, it being understood that the present invention should not be limited thereto. The first hierarchy includes primary data volume V1 while the second hierarchy includes primary data volume V2. Initially, each data volume in the first hierarchy is directly or indirectly related to primary data volume V1. This means, in one embodiment, each data volume in the first hierarchy, other than primary data volume V1, is a PIT or modified PIT copy of either primary data volume V1 or another data volume in the first hierarchy. Initially, each data volume in the second hierarchy is directly or indirectly related to primary data volume V2. This means, in one embodiment, each data volume in the second hierarchy, other than primary data volume V2, is a PIT or modified PIT copy of either primary data volume V2 or another data volume in the second hierarchy. Each data volume of the first or second hierarchy (other than the primary data volumes V1 and V2) will be described below as a PIT copy of another data volume, it being understood that the term PIT copy includes a modified PIT copy. As will be more fully described below, a data volume in the second hierarchy can be refreshed to the contents of a data volume in the first hierarchy.

Each of the data memories 16(1)-16(z) stores or can be configured to store one or more data volumes of the first and second hierarchies. Moreover, each data volume may be stored in distributed fashion in two or more of the memories 16(1)-16(z). Host node 12 can generate read or write-data transactions for accessing any of data volumes stored in memories 16(1)-16(z).

Host node 12 may include a memory for storing instructions that, when executed by host node 12, implement one embodiment of the present invention. Host node 12 may also include a data storage management system (not shown) that takes form in software instructions. The data management system includes, in one embodiment, a file system, a system for creating data volumes, and a system for managing the distribution of data of a volume across one or more memory devices. Volume Manager™ provided by VERITAS Software Corporation of Mountain View, Calif., is an exemplary system for managing the distribution of data of a volume across one or more memory devices. Volume and disk management products from other product software companies also provide a system for managing the distribution of volume data across multiple memory devices. Hardware RAID adapter cards and RAID firmware built into computer systems can also provide this function.

Figure 2:
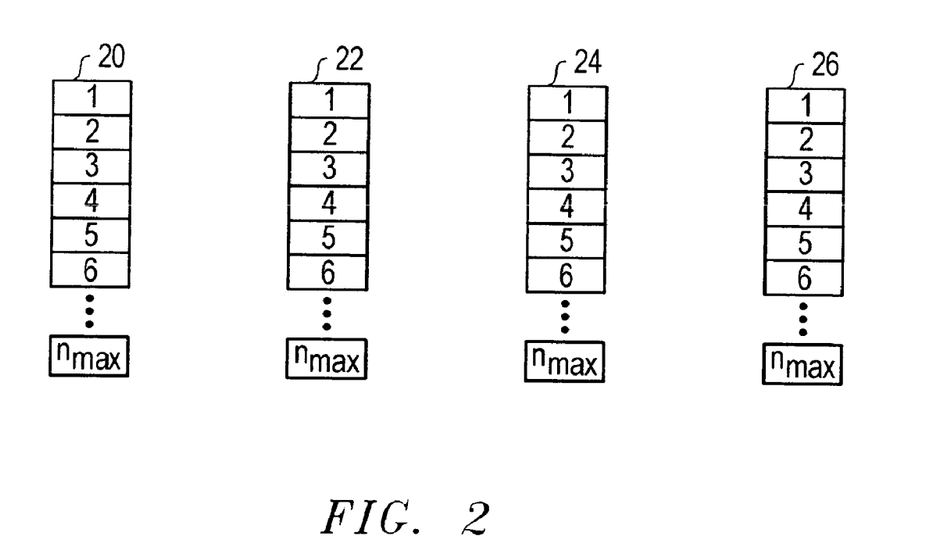
FIG. 2 shows block diagrams illustrating memory structures of the data storage systems shown in FIG. 2.

The data storage management system of host node 12 can allocate unused storage among memories 16(1)-16(z) for storing the contents of a data volume. FIG. 2 represents exemplary memory structures (memories) 20-26 allocated by host node 12 to store the primary data volumes V1 and V2 and several PIT copies thereof. More particularly, FIG. 2 shows memories 20 and 24 for storing primary data volumes V1 and V2, respectively. FIG. 2 also shows memories 22 and 26 for storing data volumes S1 and S2, respectively. As will be more fully described below, volumes S1 and S2 are PIT copies of primary data volumes V1 and V2, respectively. For ease of explanation, the present invention will be described with reference to the first hierarchy containing only the primary data volume V1 and PIT copy S1, and the second hierarchy containing only the primary data volume V2 and PIT copy S2, it being understood that the present invention should not be limited thereto. A data volume hierarchy may include any number of related data volumes. A hierarchy with a complex relationship between constituent volumes is exemplified in U.S. application Ser. No. 10/610,603 entitled Flexible Hierarchy Of Relationships And Operations In Data Volumes, which is incorporated herein by reference in its entirety.

Each memory 20-26 in FIG. 2 is shown having $n_{max}$ memory blocks. Each memory block may consist of an arbitrary large number of physical memory regions. The physical memory regions of a block need not be contiguous to each other. Further, the physical memory regions of a block need not be contained in one memory device (e.g., memory device 16(2)). However, the physical memory regions of a block are viewed as logically contiguous by the data management system executing on host node 12. Corresponding blocks in data memories 20-26 can be equal in size. Thus, memory block 1 of data memory 20 can be equal in size to memory block 1 of data memories 22-26. Each of the memory blocks in data memory 20 may be equal in size to each other. Alternatively, the memory blocks in data memory 20 may vary in size.

Data volumes S1 or S2 can be virtual or real. To illustrate, data volume S2 is virtual when some of its data is found within memory 24 rather than memory 26. In contrast, data volume S2 is real when all of its data is stored in memory 26. A virtual data volume can be converted to a real data volume via a background data copying process performed by host node 12. In the background copying process, for example, data is copied from memory 24 to memory 26 until all data of volume S2 is stored in memory 26. Contents of a data volume can be modified regardless of whether it is in the real or virtual state.

Host node 12 can create a virtual data volume according to the methods described in copending U.S. patent application Ser. No. 10/143,059 entitled, Method and Apparatus for Creating a Virtual Data Copy, which is incorporated herein by reference in its entirety. To illustrate, when host 12 first creates data volume S2, host node 12 creates at least two valid/modified (VM) maps such as VM map 34 and VM map 36 represented in FIG. 3A. VM map 34 corresponds to memory 24 while VM map 36 corresponds to memory 26. Each of the VM maps shown within FIG. 3A may be persistently stored in memory of host node 12 or elsewhere.

Figure 3A:
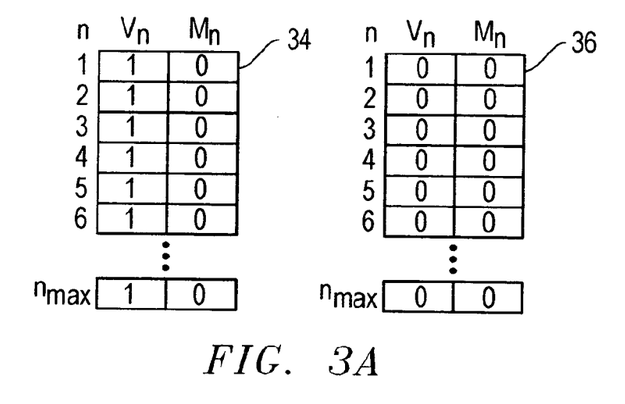
FIG. 3A illustrates Valid/Modified (VM) maps created by the host node shown in FIG. 1.

VM maps 34 and 36 may include $n_{max}$ entries of two bits each as shown in the embodiment of FIG. 3A. Each entry n of VM map 34 corresponds to a respective block n in memory 24, while each entry n of VM map 36 corresponds to a respective block n of memory 26. The first and second bits in each entry are designated $V_n$ and $M_n$, respectively. In one embodiment, $V_n$ in each entry, depending upon its state, indicates whether its corresponding memory block n contains valid data. For example, when set to logical 1, $V_2$ of VM map 34 indicates that block 2 of memory 24 contains valid data of primary volume V2, and when set to logical 0, $V_2$ of VM map 34 indicates that block 2 of memory 24 contains no valid data. It is noted that when $V_n$ (where n is any value from 1 to $n_{max}$) is set to logical 0, its corresponding memory block n may contain data, but this data is not considered valid. In similar fashion, $V_2$ of VM map 36 when set to logical 1 indicates that block 2 of memory 26 contains valid data, e.g., valid data copied from block n of memory 26. On the other hand, $V_2$ of VM map 36, when set to logical 0, indicates that block 2 of memory 26 does not contain valid data.

$M_n$ in each entry of VM maps 34 and 36, depending upon its state, may indicate whether data in a corresponding memory block n has been modified since some point in time. For example, when set to logical 1, $M_3$ of VM map 34 indicates that block 3 of memory 24 contains data that was modified via a write-data transaction since creation of data volume S2. When set to logical 0, $M_3$ of VM map 34 indicates that block 3 of memory 24 does not contain modified data. Likewise, $M_3$ in VM map 36, when set to logical 1, indicates that block 3 in memory 26 contains data that was modified via a write-data transaction since creation of the data volume S2. When set to logical 0, $M_3$ of VM map 36 indicates that block 3 of memory 26 contains no modified data of volume S2. As will be more fully described below, during an operation to refresh one data volume to the contents of another data volume, an entry n in a VM map with $V_n$ and $M_n$ set to logical 0 and 1, respectively, may indicate that data in block n of one memory (e.g., memory 24) is invalid for one volume (e.g. primary data volume V2), but valid for another volume (e.g., volume S2).

When VM map 34 is first created, $V_n$ in each entry is initially set to logical 1 thus indicating that each block n in memory 24 contains valid data of the primary volume V2. Additionally, when VM map 34 is first created, $M_n$ in each entry is initially set to logical 0 thus indicating that each block n in memory 24 initially contains unmodified data relative to volume S2. When VM map 36 is first created, $V_n$ and $M_n$ in each entry are set to logical 0. Because the bits of each entry in VM map 36 are initially set to logical 0, VM map 36 indicates that memory 26 does not contain valid or modified data of volume S2. Host node 12 can change the state of one or more bits in any VM map entry using a single or separate I/O operation at the memory address that stores the map entry.

Figure 4:
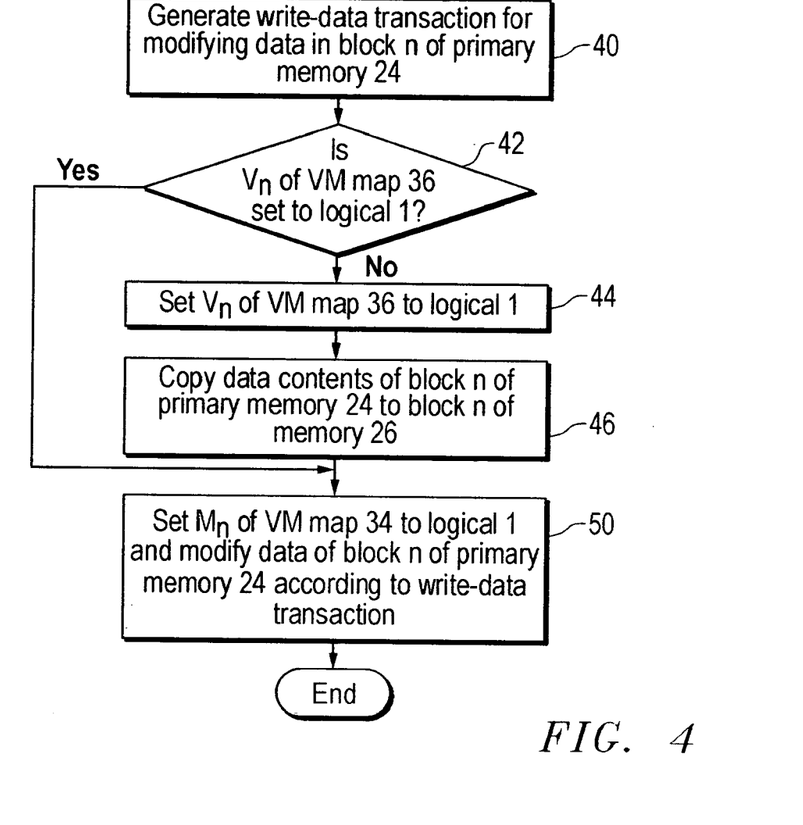
FIG. 4 is a flow chart illustrating operational aspects of writing or modifying data in a primary data volume.
Figure 5:
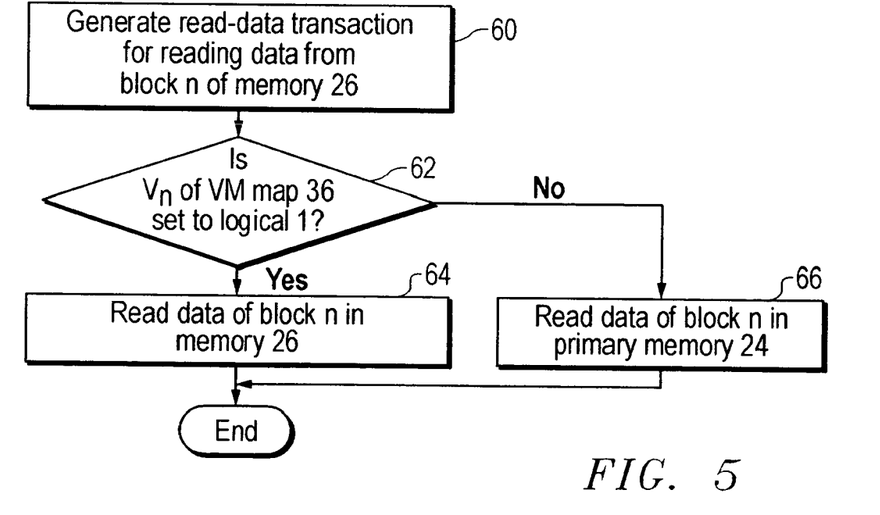
FIG. 5 is a flow chart illustrating operational aspects of reading data from memory of FIG. 1.
Figure 6:
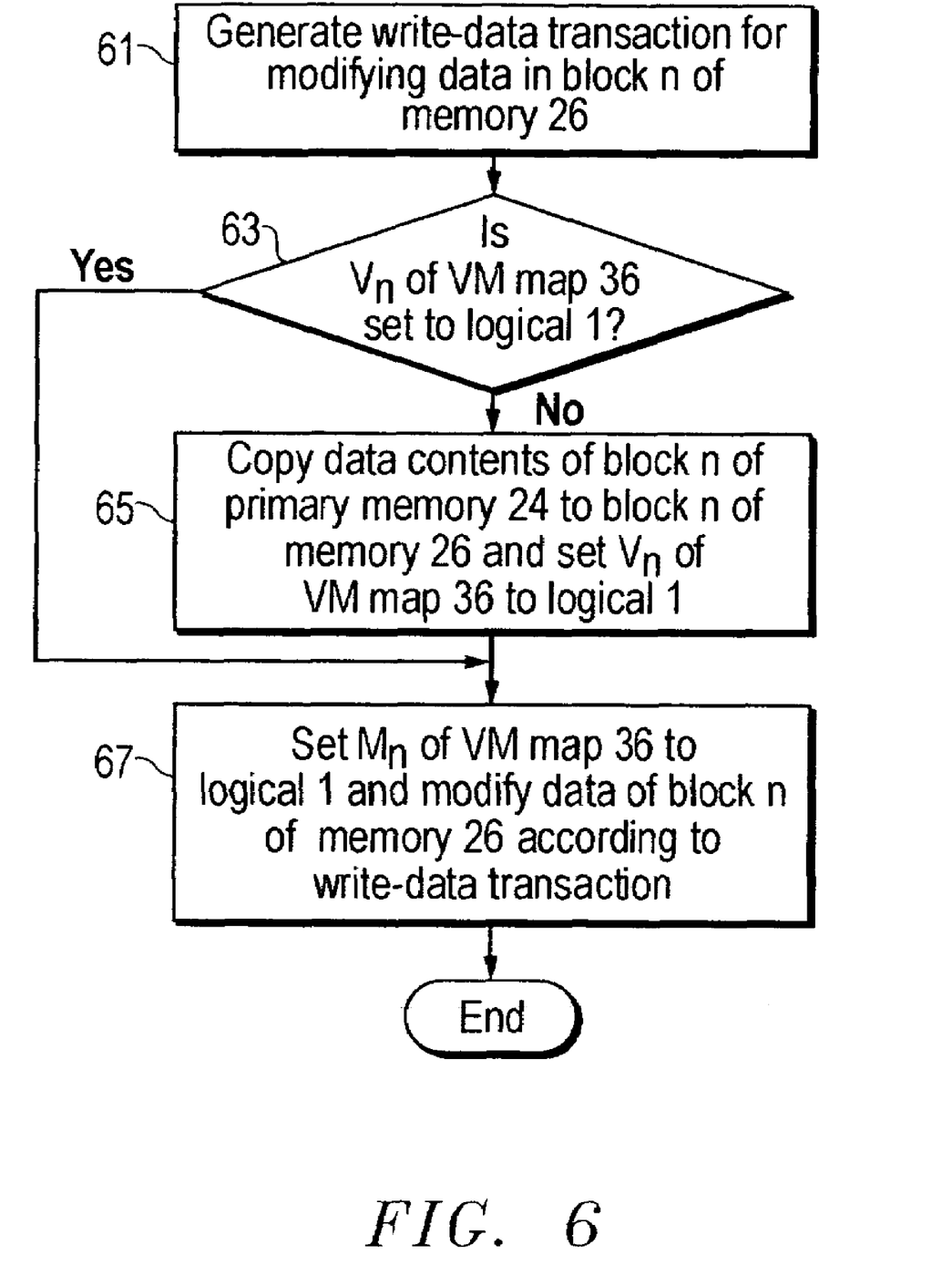
FIG. 6 is a flow chart illustrating operational aspects of modifying data in a PIT copy of the primary volume.

Host node 12 can run a background copying process to transform any virtual data volume into a real data volume. For example, host node 12 can copy data of memory 24 to memory 26 in a block-by-block or blocks-by-blocks fashion until data in all unmodified blocks n-$n_{max}$ of memory 24 are copied to blocks n-$n_{max}$, respectively, of memory 26. When the background copying process completes, virtual data volume S2 is transformed into real data volume S2. However, before this background copying process is started or completed, host node 12 can read or modify data of primary data volume V2 or data volume S2. FIGS. 4-6 illustrates relevant operational aspects of reading or modifying data.

FIG. 4 illustrates relevant aspects of modifying data in the primary data volume V2 after creation of volume S2. The flow chart shown in FIG. 4 implements one embodiment of a copy-on-write (COW) process. The process shown in FIG. 4 starts when host node 12 generates a write-data transaction for modifying data in block n of memory 24 as shown in step 40. The write-data transaction may be generated in response to host node 12 receiving a request from a client computer system coupled thereto. Before host node 12 modifies data in block n according to the transaction, host node 12 first determines whether block n of memory 26 has a valid copy of data from block n of memory 24 as the result of either the background copying process or the completion of a previous write-data transaction directed to block n of memory 24. To make this determination, host node 12 accesses VM map 36 to determine the state of $V_n$. In step 42, if $V_n$ of VM map 36 is set to logical 0, a valid copy of data does not exist in block n of memory 26, and the process proceeds to step 44 where host 12 copies the data contents of block n of primary memory 24 to block n of memory 26. Thereafter, in step 46, host node 12 sets $V_n$ of VM map 36 to logical 1. Alternatively, steps 44 and 46 can be reversed in order. In response to step 46 or in response to a determination in step 42 that $V_n$ is set to logical 1, host node 12 sets $M_n$ of VM map 34 to logical 1, and host node 12 modifies data of block n of primary memory 24 according to the write-data transaction of step 40. It should be noted that in step 50, one of the data storage systems 14(1)-14(Z) (not host node 12) performs the actual modification of data in memory 24 in response to receiving the write-data transaction from host node 12 via a communication link. For ease of explanation, host node 12 will be described as performing the function of modifying data in block n according to a write-data transaction. Moreover, it should be noted that less than all data in block n is modified by a write-data transaction, it being understood that the present invention should not be limited thereto.

In addition to the ability to modify the data contents of the primary data volume V2 before data volume S2 is transformed from the virtual state into the real state, host node 12 can read data from or modify data in volume S2. FIG. 5 illustrates operational aspects of reading data from volume S2. The process shown in FIG. 5 is started when host node 12 generates a read-data transaction for reading data from block n of memory 26. Host node 12 first determines whether block n of memory 26 has a valid copy of data as the result of either the background copying process or the completion of a previous write-data transaction directed to block n of memory 24. Accordingly, in step 62, host node accesses VM map 36 to determine the state of $V_n$ therein. If $V_n$ is set to logical 1, the data sought is stored in block n in memory 26 and read accordingly as shown in step 64. Otherwise, the data sought is read from block n of memory 24 as shown in step 66.

FIG. 6 illustrates operation aspects of modifying data of volume S2 before volume S2 is transformed into a real volume. In step 61 host node 12 generates a write-data transaction for modifying data in block n of memory 26. Host node 12 must first ascertain whether a valid copy of the data sought to be modified is contained in block n of memory 26. Accordingly, in step 63, host node accesses VM map 36 to determine the state of $V_n$ therein. If $V_n$ is set to logical 0, a valid copy of the data sought to be modified is not stored in block n of memory 26. In response, host node 12 copies the data contents of block n of memory 24 to block n of memory 26, and host node 12 sets $V_n$ of VM map 36 to logical 1 as shown in step 65. If $V_n$ is set to logical 1 in step 63 or if step 65 is performed, host node 12 sets $M_n$ (if not already set) of VM map 36 to logical 1 and subsequently modifies data of block n of memory 26 according to the write-data transaction as shown in step 67.

Figure 3B:
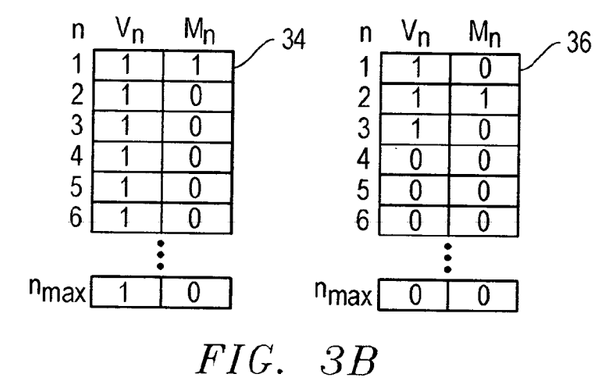
FIG. 3B illustrates VM maps of FIG. 3A after modification of data in data volumes stored in the memory structures of FIG. 2.

FIG. 3B shows the VM maps of FIG. 3A after modifying data in blocks 1 and 2 of memories 24 and 26, respectively, according to the processes of FIGS. 4 and 6. FIG. 3B also shows that data has been copied from block n of memory 24 to block n of memory 26 in accordance with the background copying process mentioned above.

Host node 12 can refresh any data volume of the second hierarchy, whether virtual or real, to the contents of a data volume in the first hierarchy, whether virtual or real, such that the refreshed data volume becomes a PIT copy of the data volume in the first hierarchy. For purposes of explanation, the present invention will be described with reference to refreshing primary data volume V2 to the contents of primary data volume V1 after creation of volume S2, but before creation of volume S1, it being understood that the present invention should not be limited thereto.

Figure 3C:
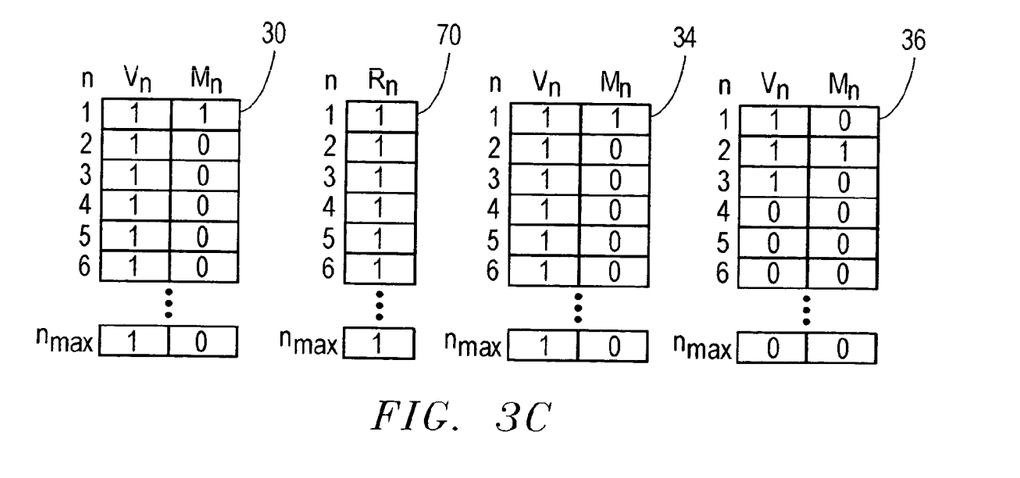
FIG. 3C illustrates VM maps of FIG. 3B along with an additional VM map and a refresh map created by the host node shown in FIG. 1.

When a command is received or generated to refresh primary volume V2 to the contents of primary volume V1, host node 12 may create a refresh map such as refresh map 70 shown in FIG. 3C. It is noted that the refresh map is not a necessity. Refresh map 70 includes $n_{max}$ entries, each having one bit. Each $R_n$ entry corresponds to block n of memory 24. $R_n$, depending upon its state, determines whether the corresponding block n of memory 24 is to be overwritten (i.e., refreshed) with new data during the refresh operation. In the illustrated example, if $R_n$ is set to logical 1, then the contents of memory block n in memory 24 are to be overwritten with data copied from block n of memory 20. If $R_n$ is set to 0, then block n of memory 24 will not be overwritten with data copied from memory 20. Initially since the volumes are unrelated, all entries $R_n$ of refresh map 70 are set to logical 1.

When a command is received or generated to refresh primary volume V2 to the contents of primary volume V1, host node creates VM map 30 shown in FIG. 3C. VM map may include $n_{max}$ entries of two bits each as shown. Each entry n of VM map 30 corresponds to a respective block n in memory 20. Like VM maps 34 and 36, the first and second bits in each entry are designated $V_n$ and $M_n$, respectively. In one embodiment, $V_n$ in each entry of map 30, depending upon its state, indicates whether its corresponding memory block n contains valid data. For example, when set to logical 1, $V_4$ of VM map 30 indicates that block 4 of memory 20 contains valid data of primary volume V1, and when set to logical 0, $V_4$ of VM map 20 indicates that block 2 of memory 20 contains no valid data. $M_n$ in each entry of VM map 30, depending upon its state, may indicate whether data in a corresponding memory block n has been modified since some point in time. For example, when set to logical 1, $M_5$ of VM map 30 indicates that block 5 of memory 20 contains data that was modified via a write-data transaction since the start of the operation to refresh primary volume V2 to the contents of primary volume V1. When set to logical 0, $M_5$ of VM map 30 indicates that block 5 of memory 20 does not contain modified data. Initially, the $V_n$ and $M_n$ bits in each entry of VM map 30 are set to logical 1 and logical 0, respectively.

Figure 3D:
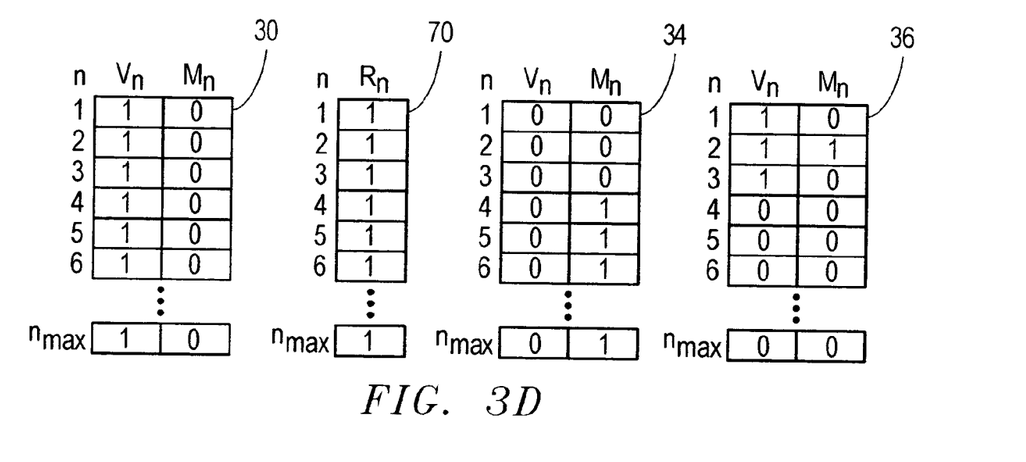
FIG. 3D illustrates VM maps of FIG. 3C after modification to preserve the contents of a virtual PIT copy of a primary data volume.

Lastly, when a command is received or generated to refresh primary volume V2 to the contents of primary volume V1, host node 12 sets each $V_n$ bit in VM map 34 to logical 0. Additionally, host node 12 may set each $M_n$ bit in VM map 34 to be the inverse of its corresponding $V_n$ bit in VM map 36. An entry in VM map 34 with $V_n$ and $M_n$ set to logical 1 and 0, respectively, indicates that data in memory 24 is invalid for volume V2, but valid for volume S2. FIG. 3D shows VM map 34 of FIG. 3C after host node 12 sets the $V_n$ and $M_n$ bits.

Figure 3E:
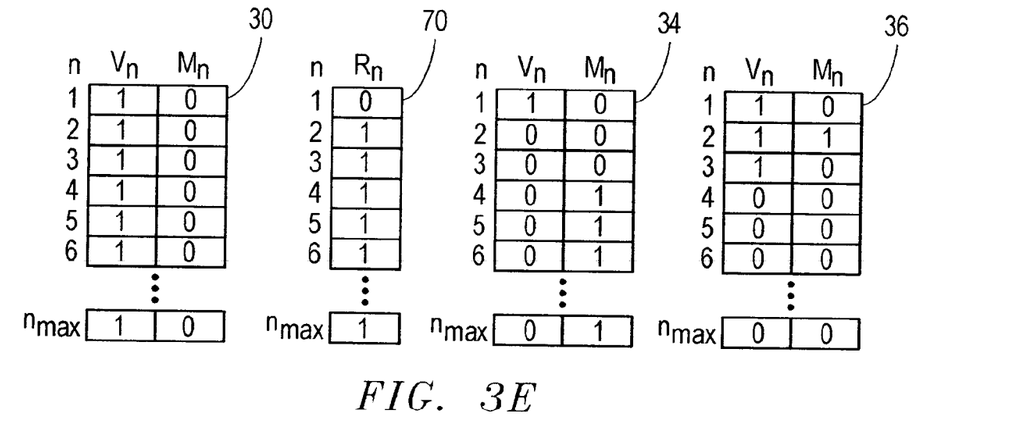
FIG. 3E illustrates VM maps of FIG. 3D after refreshing one of the memory blocks of the primary data volume.
Figure 7:
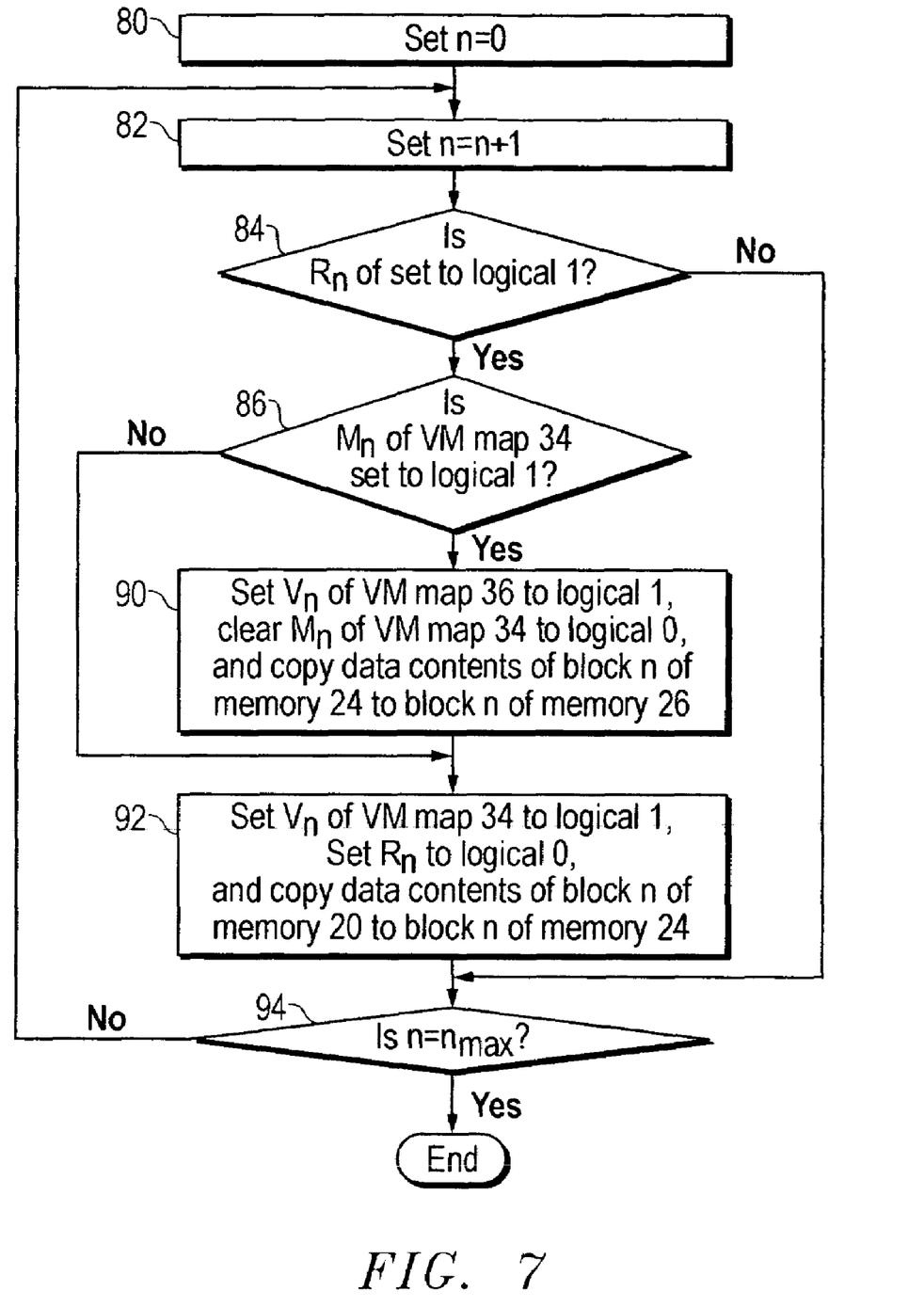
FIG. 7 is a flow chart illustrating operational aspects of a background copying process.

After setting $V_n$ and $M_n$ bits in VM map 34, primary data volume V2 can be transformed into a real PIT copy of volume V1 using, for example, a background copying process described in FIG. 7. The process in FIG. 7 initiates with host node 12 setting a dummy variable n to 0. Thereafter in step 82, host node 12 increments n by 1. Host node 12 then performs a check to determine whether data in block n of memory 24 is overwritten with data from block n of memory 20. Host node 12 makes this determination by accessing refresh map 70 and checking the state of $R_n$) therein. In step 84, if $R_n$ is set to logical 1, then block n of memory 24 contains old data of primary volume V2. However, before overwriting data in block n of memory 24, host node 12 makes a determination whether the data currently in block n of memory 24 is to be copied to block n of memory 26, thus preserving volume S2 as a PIT copy of primary volume V2. Host node 12 makes this determination by accessing VM map 34 and checking the state of $M_n$ therein. If $M_n$ is set to logical 1 in step 86, then host node 12 sets $V_n$ of VM map 36 to logical 1, clears $M_n$ of VM map 34 to logical 0, and copies the data of block n of memory 24 to block n of memory 26 as shown in step 90. Thereafter, or in a response to a determination in step 86 that $M_n$ is set to logical 0, host node 12 sets $V_n$ of VM map 34 to logical 1, sets $R_n$ to logical 0, and copies the data contents of block n of memory 20 to block n of memory 24 as shown in step 92. In step 94, host node compares variable n to $n_{max}$. If these two values are equal, the process ends and volume V2 is fully transformed into a real PIT copy of primary volume V1. Otherwise, the process repeats beginning with step 82. FIG. 3E shows the results of refreshing (i.e., overwriting) block 1 of memory 24 according to the process shown in FIG. 7.

Figure 8:
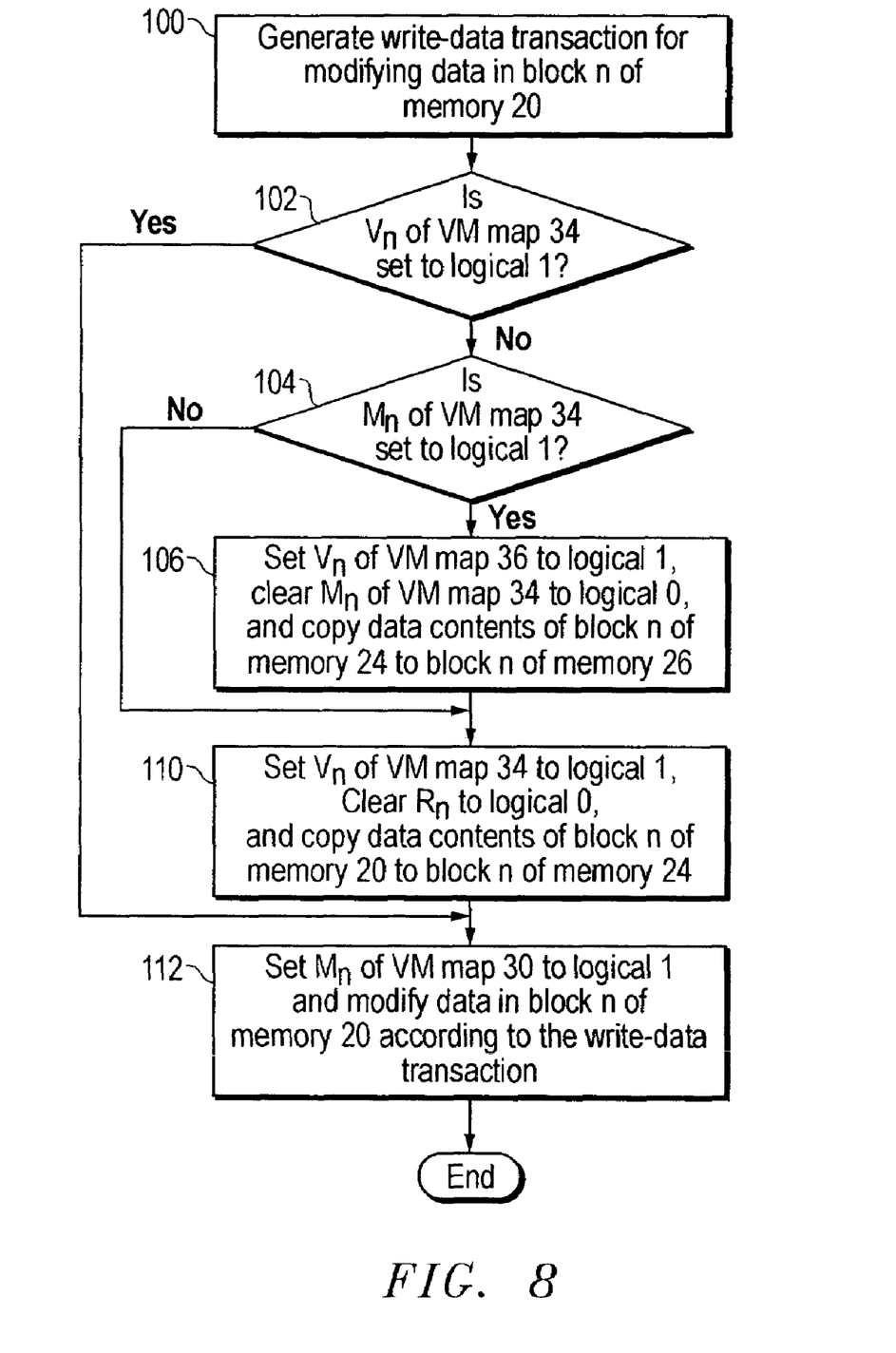
FIG. 8 is a flow chart illustrating operational aspects of writing or modifying data of a data volume.
Figure 9:
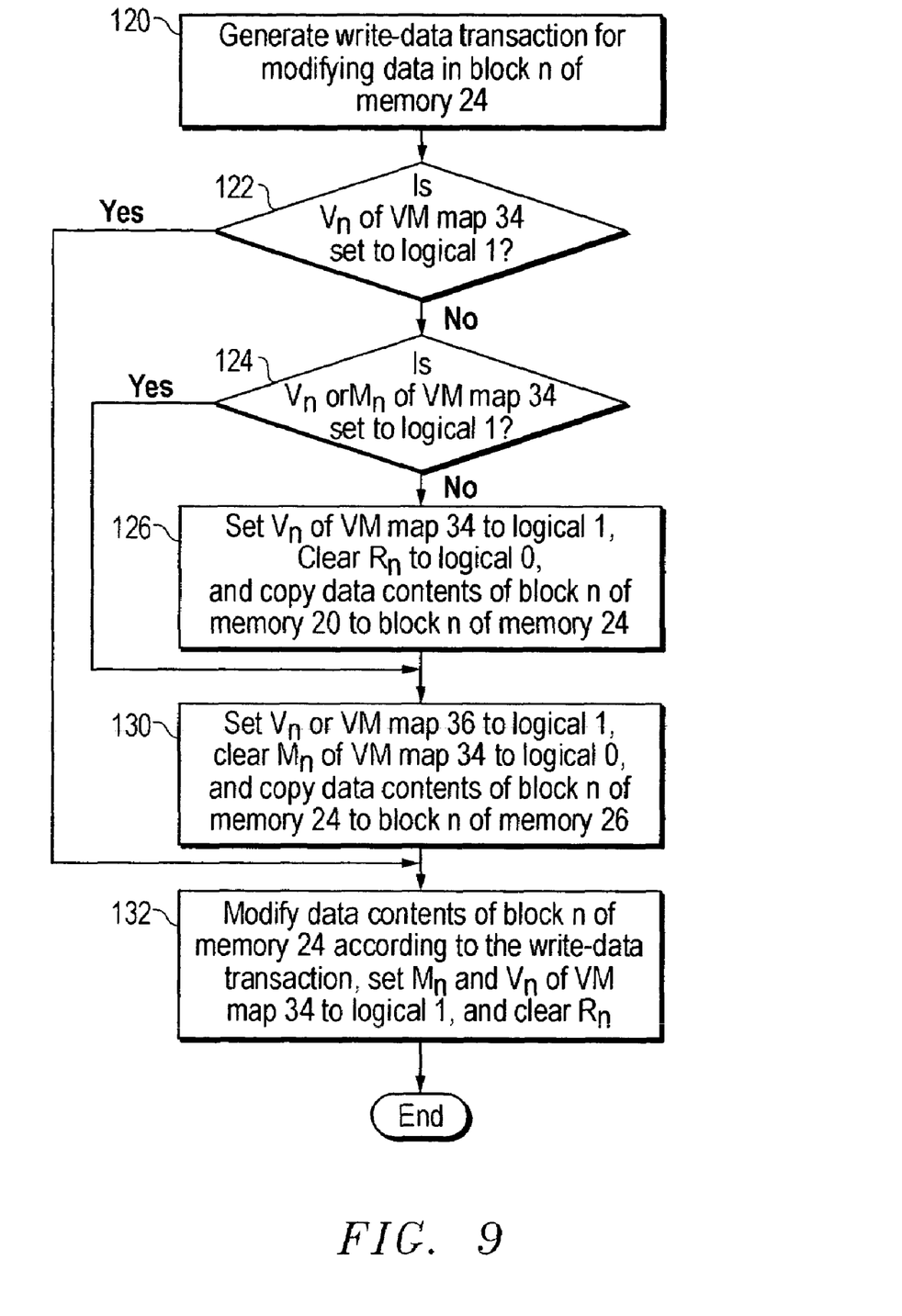
FIG. 9 is a flow chart illustrating operational aspects of writing or modifying data of a data volume.
Figure 10:
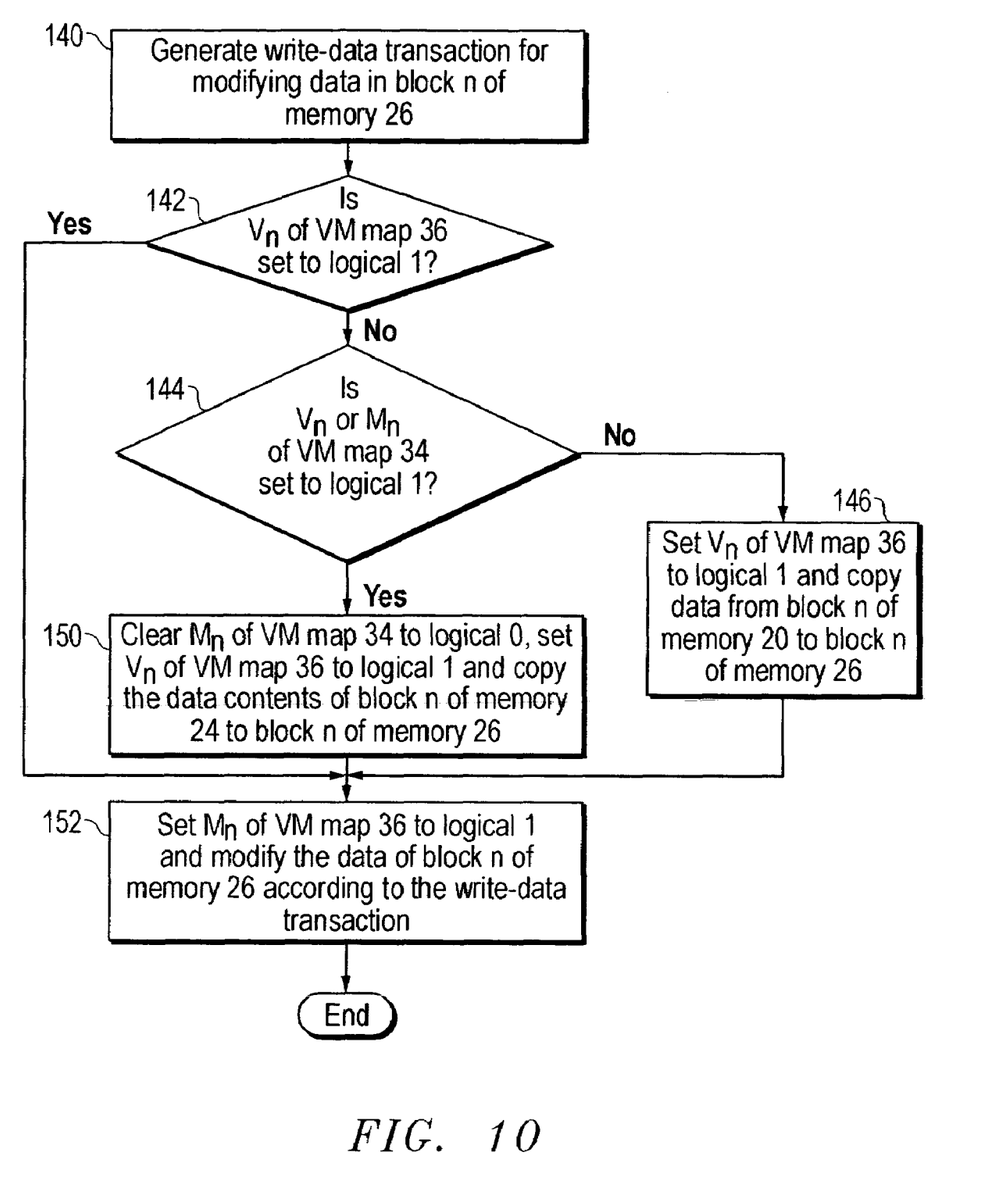
FIG. 10 is a flow chart illustrating operational aspects of writing or modifying data of a data volume.

Before the process described in FIG. 7 completes, host node 12 can read or modify data in primary data volume V2, volume S2, or primary data volume V1. FIGS. 8-10 illustrate operational aspects of modifying data in any one of these three data volumes prior to completion of the background copying process of FIG. 7. FIG. 8 illustrates relevant operational aspects of modifying data in the primary data volume V1. The process in FIG. 8 initiates when host node 12 generates a write-data transaction for modifying data in block n of memory 20 as shown in step 100. Before data in block n of memory 20 is modified, host node 12 checks whether corresponding block n in memory 24 is overwritten with data from block n of memory 20. More particularly, host node accesses VM map 34 to determine the state of $V_n$ therein. If, in step 102, $V_n$ is set to logical 0, block n in memory 24 lacks a valid copy of block n in memory 20. However, before block n in memory 24 is overwritten, host node 12 must ensure that block n in memory 26 has a valid copy of data to preserve volume S2 as a PIT copy of volume V2. Accordingly host node 12 accesses VM map 34 and determines the state of $M_n$ therein. If, in step 104, $M_n$ is set to logical 1, then in step 106, host node 12 sets $V_n$ of VM map 36 to logical 1, clears $M_n$ of VM map 34 to logical 0, and copies the data contents of block n of memory 24 to block n of memory 26. After step 106 or in response to a determination that $M_n$ is set to logical 0 in step 104, host node 12 sets $V_n$ of VM map 34 to logical 1, clears $R_n$ to logical 0, and copies the data contents of block n of memory 20 to block n of memory 24 as shown in step 110. If $V_n$ is set to logical 1 in step 102 or after step 110, host node 12 sets $M_n$ of VM map 30 to logical 1 and modifies data in block n of memory 20 according to the write-data transaction generated in step 100.

FIG. 9 illustrates relevant operational aspects of modifying data in volume V2 prior to volume V2 being fully refreshed to the contents of volume V1. The process in FIG. 9 initiates in step 120 when host node 12 generates a write-data transaction for modifying data in block n of memory 24. Before host node 12 modifies this data, host node determines whether block n is refreshed with data copied from block n of memory 20. More particularly, host node 12 accesses VM map 34 to determine the state of $V_n$ therein. If $V_n$ is set to logical 0 in step 122, then data in block n of memory 24 is not refreshed with data from block n of memory 20. However, before block n of memory 24 is refreshed, block n of memory 26 should have a valid copy. Accordingly, in step 124 host node accesses VM map 34 to determine the state of $M_n$ therein. If $M_n$ (or $V_n$) of VM map 34 is set to logical 0 in step 124, host node 12 sets $V_n$ of VM map 34 to logical 1, clears $R_n$ to logical 0, and copies the data contents of block n of memory 20 to block n of memory 24 as shown in step 126. If $M_n$ (or $V_n$) is set to logical 1 in step 124 or after execution of step 126, the process proceeds to step 130 where host node sets $V_n$ of VM map 36 to logical 1, clears $M_n$ of VM map 34 to logical 0, and copies the data contents of block n of memory 24 to block n of memory 26. If in step 122 $V_n$ is set to logical 1 or after execution of step 130, host node 12 sets $V_n$ and $M_n$ of VM map 34 to logical 1, and host node 12 modifies the data contents of block n in memory 24 according to the write-data transaction of step 120.

FIG. 10 illustrates relevant operational aspects of modifying data of volume S2 prior to completing the refresh operation illustrated in FIG. 7. The process in FIG. 10 initiates when host node 12 generates a write-data transaction for modifying data in block n of memory 26. Host node 12 must first determine whether block n in memory 26 contains a valid copy of data in volume V2 before host node 12 can modify data according to the write-data transaction. To this end, host node accesses VM map 36 to determine the state of $V_n$ therein.

If $V_n$ is set to logical 1 in step 142, block n in memory 26 contains valid data. If, however, in step 142 $V_n$ is set to logical 0, then host node accesses VM map 34 to determine the state of $V_n$ and $M_n$ therein. If $V_n$ or $M_n$ is set to logical 1 in step 144, the process proceeds to step 150 where host node clears $M_n$ of map 34 to logical 0, sets $V_n$ of VM map 36 to logical 1 and copies the data contents of block n of memory 24 to block n of memory 26 as shown in step 150. If neither $V_n$ nor $M_n$ is set to logical 1 in step 144, the process proceeds to step 146 where host node 12 sets $V_n$ of VM map 36 to logical 1 and copies data from block n of memory 20 to block n of memory 26. Ultimately, host node, in step 152, sets $M_n$ of VM map 36 to logical 1 and modifies the data of block n of memory 26 according to the write-data transaction generated in step 140.

Figure 3F:
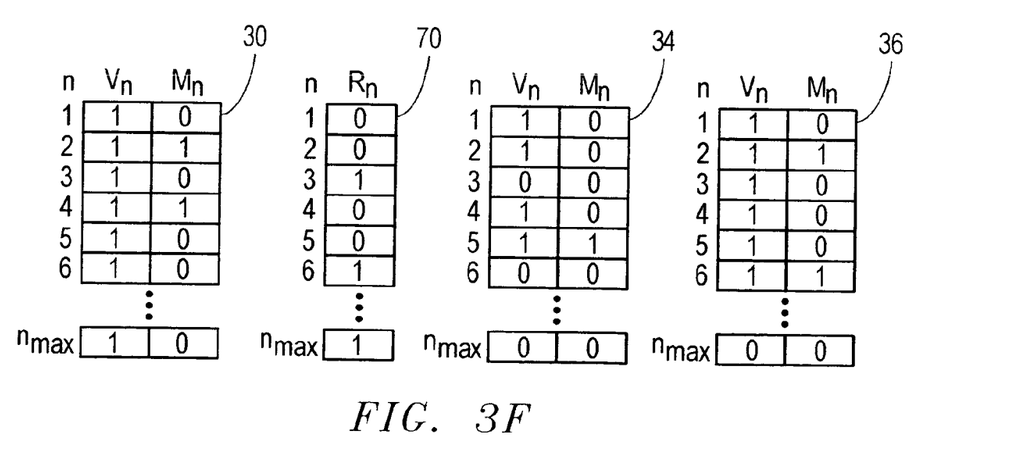
FIG. 3F illustrates VM maps of FIG. 3E after modification of the primary data volumes.

FIG. 3F illustrates modification of the VM maps in FIG. 3E after modifying blocks 2 and 4 of memory 20 in accordance with the process shown in FIG. 8. FIG. 3F shows the results of setting entry 5 in VM map 34 in accordance with the process shown in FIG. 9 in response to generation of a write-data transaction for modifying data in block 5 of memory 24. Finally, FIG. 3F shows the results of modifying data in block 6 of according to the process shown in FIG. 10.

Although the present invention has been described in connection with several embodiments, the invention is not intended to be limited to the specific forms set forth herein. For example, the foregoing illustrates relevant aspects of refreshing primary volume V2 to the contents of primary volume V1 prior to the creation of data volume S1. Volume V2 could have been refreshed to the contents of volume V1 after creation of data volume S1. Moreover, volumes S1 may have been created after volume V2 is refreshed to the data contents of primary data volume V1. Alternatives, modifications, and equivalents as can be reasonably included within the scope of the invention as defined by the appended claims.

FIG. 3F illustrates modification of the VM maps in FIG. 3E after modifying blocks 2 and 4 of memory 20 in accordance with the process shown in FIG. 8. FIG. 3F shows the results of setting entry 5 in VM map 34 in accordance with the process shown in FIG. 9 in response to generation of a write-data transaction for modifying data in block 5 of memory 24. Finally, FIG. 3F shows the results of modifying data in block 6 according to the process shown in FIG. 10.

What is claimed is:

1. A method comprising:
    writing first and second data to first and second data volumes, respectively, wherein
        the first data volume is a first primary volume,
        the second data volume is a second primary volume, and
        the first and second data volumes are unrelated data volumes;
    refreshing the second data volume to the data contents of the first data volume that existed at time T, wherein refreshing the second data volume further comprises overwriting data of the second data volume with data of the first data volume that existed at time T,
    generating first and second maps in memory, wherein
        each of the first and second maps comprises
            a plurality of entries, wherein
                each entry of the first map corresponds to a respective memory block that stores data of the first data volume, and
                each entry of the second map corresponds to a respective memory block that stores data of the second data volume,
    setting a first bit in each entry of the first map, wherein each first bit of the first map is set to indicate its respective memory block stores valid data, and
    clearing a first bit in each entry of the second map, wherein
        each first bit of the second map is set to indicate its respective memory block stores invalid data;
    modifying data of the first data volume while the second data volume is being refreshed to the data contents of the first data volume that existed at time T;
    modifying data of the second data volume while the second data volume is being refreshed to the data contents of the first data volume that existed at time T; and
    modifying data of the first data volume after the second data volume has been refreshed.

2. The method of claim 1 further comprising creating one or more PIT copies of the first data volume prior to refreshing the second data volume to the data contents of the first data volume.

3. The method of claim 2 wherein one of the PIT copies of the first data volume is in a virtual state when the second data volume is refreshed to the data contents of the first data volume.

4. The method of claim 1 further comprising an act of preserving the second data volume, wherein said preserving comprises creating one or more PIT copies of the second data volume prior to refreshing the second data volume to the data contents of the first data volume.

5. The method of claim 4 wherein one of the PIT copies of the second data volume is in the virtual state when the second data volume is refreshed to the data contents of the first data volume.

6. The method of claim 1 wherein the first data volume is a real or virtual PIT copy of another data volume when the second data volume is refreshed to the data contents of the first data volume.

7. The method of claim 1 wherein the second data volume is a real or virtual PIT copy of another data volume when the second data volume is refreshed to the data contents of the first data volume.

8. The method of claim 1 further comprising:
    setting or clearing a second bit in each entry of the second map to indicate that its respective memory block stores data needed for a PIT copy of the second data volume.

9. The method of claim 1 further comprising an act of preserving the second data volume, wherein said preserving comprises creating a PIT copy of the second data volume before or while refreshing the second data volume to the data contents of the first data volume.

10. A computer readable medium storing instructions executable by a computer system, wherein the computer system implements a method in response to executing the instructions, the method comprising:
    writing data to a first and a second data volume, wherein
        the first data volume is a first primary volume,
        the second data volume is a second primary volume,
        the first and second data volumes are unrelated data volumes;
    refreshing the second data volume to the data contents of the first data volume that existed at time T, wherein refreshing the second data volume further comprises overwriting data of the second data volume with data of the first data volume that existed at time T,
    generating first and second maps in memory, wherein
        each of the first and second maps comprises
            a plurality of entries, wherein
                each entry of the first map corresponds to a respective memory block that stores data of the first data volume, and each entry of the second map corresponds to a respective memory block that stores data of the second data volume, setting a first bit in each entry of the first map, wherein
each first bit of the first map is set to indicate its respective memory block stores valid data, and
clearing a first bit in each entry of the second maps wherein
each first bit of the second map is set to indicate its respective memory block stores invalid data;
modifying data of the first data volume while the second data volume is being refreshed to the data contents of the first data volume that existed at time T;
modifying data of the second data volume while the second data volume is being refreshed to the data contents of the first data volume that existed at time T; and
modifying data of the first data volume after the second data volume has been refreshed.

11. The computer readable medium of claim 10 wherein the method further comprises creating one or more PIT copies of the first data volume prior to refreshing the second data volume to the data contents of the first data volume.

12. The computer readable medium of claim 11 wherein one of the PIT copies of the first data volume is in the virtual state when the second data volume is refreshed to the data contents of the first data volume.

13. The computer readable medium of claim 10 further comprising an act of preserving the second data volume, wherein said preserving further comprises creating one or more PIT copies of the second data volume prior to refreshing the second data volume to the data of the first data volume.

14. The computer readable medium of claim 13 wherein one of the PIT copies of the second data volume is in the virtual state when the second data volume is refreshed to the data contents of the first data volume.

15. The computer readable medium of claim 10 wherein the first data volume is a real or virtual PIT copy of another data volume when the second data volume is refreshed to the data contents of the first data volume.

16. The computer readable medium of claim 10 wherein the second data volume is a real or virtual PIT copy of another data volume when the second data volume is refreshed to the data contents of the first data volume.

17. The computer readable medium of claim 10 further comprising an act of preserving the second data volume, wherein said preserving further comprises creating a PIT copy of the second data volume before or while refreshing the second data volume to the data of the first data volume.

\* \* \* \* \*